United States Patent [19]

Stanik

[11] Patent Number: 5,021,155
[45] Date of Patent: Jun. 4, 1991

[54] MEMBRANE FILTER PLATE

[75] Inventor: Reimund Stanik, Marktoberdorf-Leuterschach, Fed. Rep. of Germany

[73] Assignee: Klinkau Besitzgesellschaft mbH, Fed. Rep. of Germany

[21] Appl. No.: 448,897

[22] Filed: Dec. 12, 1989

[30] Foreign Application Priority Data

Dec. 19, 1988 [DE] Fed. Rep. of Germany ....... 3842662

[51] Int. Cl.⁵ .................... B01D 25/168; B01D 25/21
[52] U.S. Cl. ..................................... 210/231; 210/228; 210/229; 100/211; 100/295; 100/194
[58] Field of Search ............... 210/224, 227, 228, 229, 210/231; 100/194, 197, 211, 295

[56] References Cited

U.S. PATENT DOCUMENTS

| | | | |
|---|---|---|---|
| 3,926,811 | 12/1975 | Ramsteck | 210/227 |
| 4,166,035 | 8/1979 | Ramsteck | 210/231 |
| 4,235,721 | 11/1980 | Nakamura et al. | 210/227 |
| 4,508,623 | 4/1985 | Heckl et al. | 210/229 |
| 4,746,428 | 5/1988 | Junker et al. | 210/231 |
| 4,776,955 | 10/1988 | Wildner | 210/228 |
| 4,826,593 | 5/1989 | Nev | 210/231 |
| 4,832,840 | 5/1989 | Klinkau et al. | 210/228 |
| 4,839,045 | 6/1989 | Wildner | 210/231 |
| 4,897,190 | 1/1990 | Klinkau et al. | 210/231 |

FOREIGN PATENT DOCUMENTS 0081715 7/1986 European Pat. Off. .

*Primary Examiner*—W. Gary Jones
*Attorney, Agent, or Firm*—Hill, Van Santen, Steadman & Simpson

[57] ABSTRACT

A filter plate arrangement for a filter press which includes a carrier plate, at least one membrane arranged on the side of the carrier plate having spacing ribs for positioning a filter cloth, a sealing edge frame for securing the membrane to the carrier plate with a fluid-tight connection and a chamber plate secured on an outer surface of the sealing edge frame is characterized by an improved design to limit stressing of the membrane as it moves from a filtering phase to a pressing phase. These improvements include the thickness of the frame adjacent an inner peripheral edge being substantially the same as the height of the spacing ribs and the chamber plate having an olique portion extending from the surface at an angle to a center plane of the carrier plate from a line immediately adjacent the peripheral edge so that during the pressing stage, the membrane will not be subjected to extreme bends to cause rupture or tearing thereof.

2 Claims, 1 Drawing Sheet

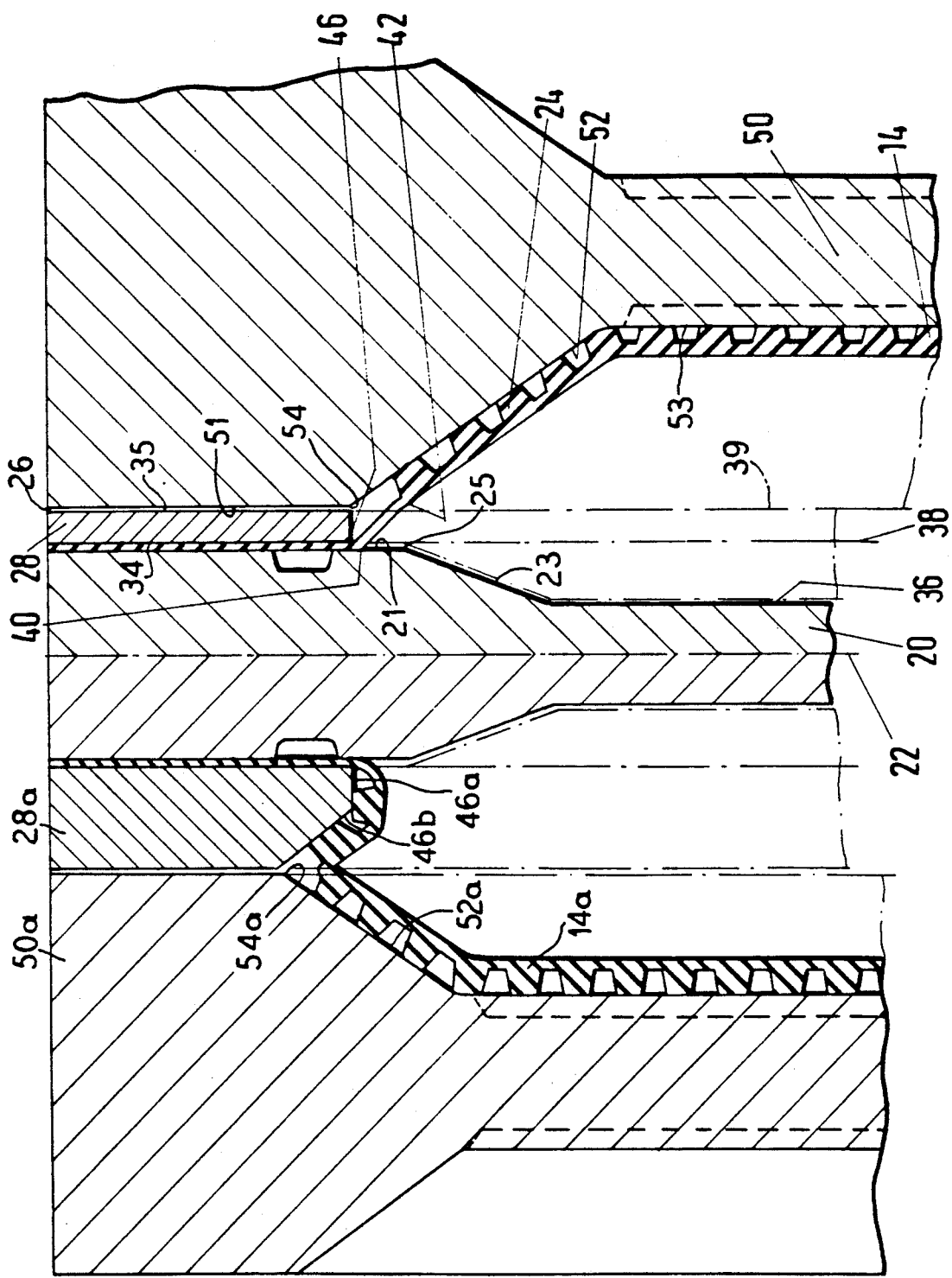

MEMBRANE FILTER PLATE

BACKGROUND OF THE INVENTION

The present invention is directed to a membrane filter plate for a filter press comprising a carrier plate, at least one membrane arranged on a side of the carrier plate and being provided with distancing cams or spacing ribs for the placement of filter cloth or the like. The membrane filter plate also includes a sealing edge frame that surrounds the carrier plate and the membrane and connects these to one another in a solvent-tight arrangement.

U.S. Pat. No. 4,832,840, whose disclosure is incorporated by reference, and European Patent 00 81 715 both disclose a membrane filter plate for a filter press which comprises a carrier plate, at least one membrane arranged on one side of the carrier plate and provided with distancing cams or spacing ribs for the spacing of a filter cloth or the like from the membrane and includes a sealing edge frame that surrounds the carrier plate and the membrane and connects these to one another in an essentially solvent-tight arrangement. The carrier plate has circumferential surfaces which surround a recess portion and coact with circumferential surfaces of the edge frame which are parallel to the center plane of the plate and define the distance of the membrane plane in an unstressed, normal position from the center plane. The seating surface of the carrier plate facing toward the membrane is fashioned to extend from the connecting line of the membrane to the sealing edge frame, essentially parallel at first to the center plane of the carrier plate to provide desired bending lines for the filtration phase and, respectively, pressing phase and then extends obliquely at an angle of about 15° toward said center plane of the carrier plate and then parallel to the center plane of the carrier plate over essentially the entire central region of the carrier plate.

During the re-pressing process of these prior art devices, the membrane shapes the filter cake and then proceeds on a path that is determined by the filter cake. This path is undefined. It has also been shown that it is not possible to observe a specific membrane path, even given an involved machine control. Since the carrier is usually combined with a chamber plate, the membrane traverses the full path in the extreme case and the re-pressing pressure presses it against the edges of the carrier plate edge and of the chamber plate. This then leads to a tearing of the membrane.

SUMMARY OF THE INVENTION

An object of the present invention is to create a membrane filter plate for a filter press, wherein a tearing of the membrane is also impossible or greatly reduced when the membrane is pressed against the edge of the membrane plate edge and against the chamber plate due to a re-pressing pressure. This object is inventively achieved by an improvement in a membrane filter plate for a filter press comprising a carrier plate, at least one membrane arranged at one side of the carrier plate and provided with distancing cams or ribs for the placement of a filter cloth or the like and a sealing edge frame surrounding the carrier plate and the membrane and connecting these to one another in an essentially solvent- or liquid-tight manner. The circumferential surfaces of the sealing frame edge are parallel to a center plane of the carrier plate at both sides of the carrier plate and the carrier plate has circumferential surfaces coacting with the circumferential surfaces of the sealing edge to define the distance of the membrane plane in an unstressed, normal position relative to the center plane. The carrier plate has a seating surface that faces toward the membrane which is fashioned to, first, extend essentially parallel to the central plane of the carrier plate beginning at a connecting line of the membrane to the inner peripheral edge of the sealing edge frame in order to generate a respectively desired bending line for the filtration phase and also for the pressing phase and then extends obliquely toward said center plane of the carrier plate at an angle of about 15° and then extends parallel to said center plate of the carrier plate in essentially an entire central region of the carrier plate, and the device further includes a chamber plate which is attached to the carrier plate. The improvements are that the center edge frame spaces the chamber plate from the carrier plate and has a thickness corresponding to the height of the distancing ribs and that the surface of the chamber plate facing toward the membrane plate is constructed to proceed obliquely away from the membrane plate at an angle of 10°–45° beginning on a line lying adjacent the inner peripheral edge of the edge frame and is then fashioned to extend parallel to the center plane of the carrier plate over the entire central region of the chamber plate.

Preferably, the angle that the seating surface proceeds to the plane parallel to the center plane of the carrier plate is smaller than the angle on which the oblique surface of the chamber plate proceeds relative to this plane.

Other advantages and features of the invention will be readily apparent from the following description of the preferred embodiments, the drawings and claims.

BRIEF DESCRIPTION OF THE DRAWINGS

The FIGURE is a partial cross sectional view of a filter plate comprising the carrier plate on which a chamber plate of the prior art is attached on the left-hand side and to which a chamber plate of the present invention is attached on the right-hand side.

DESCRIPTION OF THE PREFERRED EMBODIMENTS

The principles of the present invention are particularly useful when incorporated in a membrane filter plate which includes a carrier plate 20, a membrane 14, a sealing edge frame 28, a filter cloth 26 and a chamber plate 50. As illustrated in FIG. 1, the carrier plate 20 has a sealing surface 21 around its periphery which extends parallel to a center plane 22. The carrier plate 20 also has a seating surface 36 which is recessed from the plane of the sealing surface 21 and is connected thereto by an oblique surface portion 23 that extends at an angle of approximately 15° to the plane 22.

The peripheral edge frame 28 has parallel extending circumferential surfaces 34 and 35 and is secured to the carrier plate 20 with the surface 34 coacting with the surface 21 to clamp a peripheral edge of the membrane 14 in a fluid-tight condition. As illustrated, the other peripheral circumferential surface 35 coacts with a surface 51 of the chamber plate 50 to clamp the filter cloth 26. When no pressures are applied, the membrane 14 will extend along the line 38 while the filter cloth 26 extends along the line 39 and is spaced from the membrane by a plurality of spacing or distancing cams or ridges 24.

The chamber plate 50 also has a recessed surface 53 which is connected by an obliquely extending portion 52 which extends at an angle of 10°–45° to the center plane 22 of the carrier plate 20. As illustrated, the surface 52 merges with a surface 51 along a line 54 which is immediately adjacent an inner peripheral edge 46 of the edge frame 28. Preferably, the angle between the surfaces 52 and 53 is greater than the angle between the surfaces 23 and 36.

The edge frame 28 has a thickness between the surfaces 34 and 35 which is approximately or roughly equal to the height of the distancing or spacing ribs 24 of the membrane 14. As illustrated, the membrane is in the pressing mode or phase and has a bend line 40 adjacent the inner peripheral edge 46 and a second bend line approximately at 42. This second bend line 42 will conform or is spaced from the peripheral surface 46 a distance corresponding to the distance of the line 25 formed between the planar surface 21 and the oblique surface 23 of the plate 20. Thus, when in the filtering mode, the membrane 14 will rest on the seating surface 21 with the bend 42 being at the line 25. Also, the filter cloth 26 will be supported on the exposed surfaces of the ribs 24. In the pressing mode, as illustrated, the material, such as the filter cake, will be pressed between the cloth, which is supported on the ribs 24 and the surface 53, as the membrane moves toward the surface 53. As illustrated in the FIGURE, no filter cake is present.

In a prior art arrangement illustrated in the left-hand side of the FIGURE, a sealing edge frame 28a has a thickness greater than the height of the ribs 24 and usually was provided with an end face 46a with a beveled portion 46b. In addition, the chamber has its oblique surface 52a extending to be opposite or adjacent an edge 54a. As a result, the membrane 14a, during the pressing phase or mode, is subjected to sharp bending in contrast to the rather shallow bending occurring at the bend lines 40 and 42. This sharp bending of the prior art arrangement, on the lefthand side of the FIGURE, will result in overstressing and possible tearing of the membrane. The improved device illustrated in the right-hand side of the FIGURE, in accordance with the present invention, reduces the overstressing that occurred in the prior art arrangement during the pressing phase and the bending around the first bend line 40 is limited by the contour of the chamber plate 50.

Although various minor modifications may be suggested by those versed in the art, it should be understood that we wish to embody within the scope of the patent granted hereon all such modifications as reasonably and properly come within the scope of our contribution to the art.

We claim:

1. In a membrane filter plate for a filter press comprising a carrier plate having a center plane, at least one membrane being arranged on one side of the carrier plate and being provided with spacing ribs for placement of a filter cloth, a sealing edge frame surrounding the carrier plate and clamping the membrane against the carrier plate to connect the membrane and the carrier plate to one another essentially in a fluid-tight arrangement, said sealing edge frame having an inner peripheral edge and having circumferential planar surfaces extending parallel to said center plane of the carrier plate and coacting with a peripheral flat surface of the carrier plate that extends parallel to said center plane, said carrier plate having a seating surface facing toward the membrane and extending parallel to the center plane being connected to the peripheral flat surface of the plate by an oblique surface portion extending at an angle of approximately 15° to the center plane so that during the filtration phase and the pressing phase, the membrane has spaced bend lines determined by the surfaces of the carrier plate and the inner peripheral edge of the edge frame, said membrane filter plate including a chamber plate attached to the carrier plate with the improvements comprising the thickness of the edge frame at least at the inner peripheral edge being approximately equal to the height of the spacing ribs of the membrane and the surface of the chamber plate facing toward the membrane having a first flat peripheral portion, a second portion proceeding obliquely therefrom and obliquely away from the carrier plate at an angle of a range of 10°–45° beginning at a line immediately adjacent the inner peripheral edge of the edge frame and then merging in a second flat surface extending parallel to the center plane of the carrier plate over the entire central region of the chamber plate.

2. In a membrane filter plate according to claim 1, wherein the angle of the oblique surface portion of the carrier plate between the peripheral surface and the seating surface is less than the angle of the second portion of the chamber plate relative to the center plane of the carrier plate.

* * * * *